(12) United States Patent
Shue (10) Patent No.: US 6,255,802 B1
(45) Date of Patent: Jul. 3, 2001

(54) APPARATUS AND METHOD FOR CONTROLLING BATTERY CHARGING WITH VARIABLE CURRENT

(75) Inventor: Shang-Ann Shue, Taipei Hsien (TW)

(73) Assignee: Acer, Inc. (TW)

( * ) Notice: Subject to any disclaimer, the term of this patent is extended or adjusted under 35 U.S.C. 154(b) by 0 days.

(21) Appl. No.: 09/640,708

(22) Filed: Aug. 18, 2000

(30) Foreign Application Priority Data

May 19, 2000 (TW) .............................................. 089109998

(51) Int. Cl.[7] .......................... H01M 10/44; H01M 10/46
(52) U.S. Cl. .............................................. 320/132; 320/162
(58) Field of Search .................................... 320/125, 132, 320/148, 149, 150, 153, 162, DIG. 21

(56) References Cited

U.S. PATENT DOCUMENTS

| | | |
|---|---|---|
| 3,597,673 | * 8/1971 | Burkett . |
| 3,667,026 | * 5/1972 | Bogut et al. . |
| 3,919,618 | * 11/1975 | Coleman et al. . |
| 5,291,116 | * 3/1994 | Feldstein . |
| 5,523,667 | * 6/1996 | Feldstein . |

* cited by examiner

*Primary Examiner*—Edward H. Tso
(74) *Attorney, Agent, or Firm*—Michael D. Bednarek; Shaw Pittman (57) ABSTRACT

An apparatus provides a charging battery for variable currents. The apparatus comprises a first current sensor which transforms a current into a first signal; a controller which depends on the first signal to transform a power into a current in order to supply the variable currents to charge; a second current sensor which transforms the variable currents into second signals and passes the variable currents to charge up the charging battery; a detector which relies on the second signal and a third signal in response to the charging battery to trigger the controller to decide whether to disable from the controller or not.

12 Claims, 7 Drawing Sheets

APPARATUS AND METHOD FOR CONTROLLING BATTERY CHARGING WITH VARIABLE CURRENT

REFERENCE TO RELATED APPLICATION

The present application claims priority to Taiwan application No. 089109998, entitled "APPARATUS AND METHOD ON CHARGING," filed on May 19, 2000.

BACKGROUND OF THE INVENTION

1. Field of the Invention

For variable currents charging, an apparatus detects the saturation status of a charging battery by monitoring the properties of energy consumption of the charging battery's equivalent resistance.

2. Description of the Related Art

Portable products such as cellular phones, notebook computers and related products, are increasingly popular. These portable products have increasingly improved functions thereby satisfying a wide range of consumers. As advanced as these products are, advances in improving battery operation time tends to fall behind the pace of innovation of the portable products themselves. At present there is much research focusing on extending the operation time of a battery by, e.g., saving power consumed by the products. Extending the operation time of a battery also increases the charging time of the battery. Therefore, it is desirable, to the extent possible, to decrease the charging time of a battery.

Figure 1:
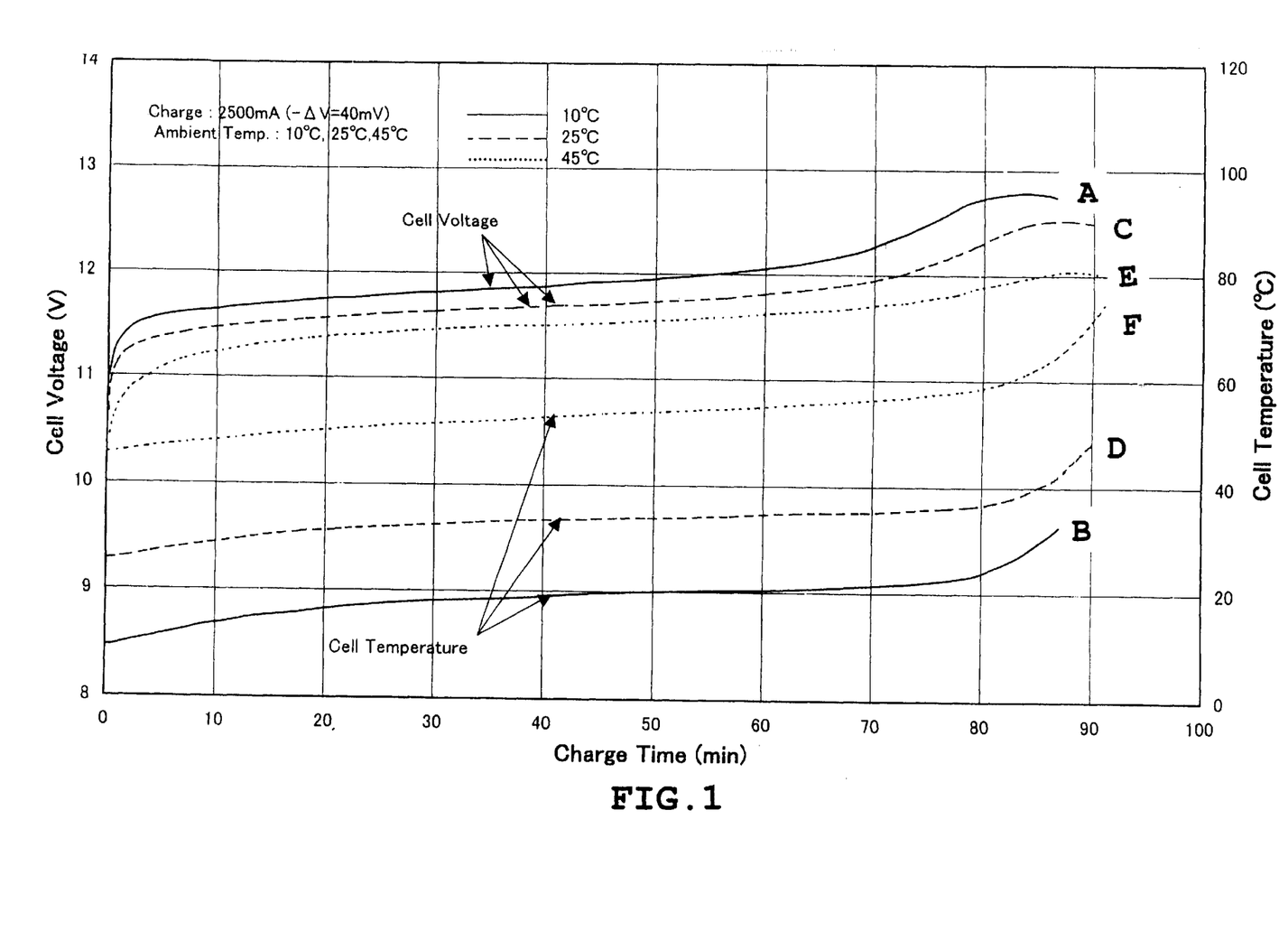
FIG. 1 illustrates a curve line diagram of charging battery voltage variation with the charging time for ambient temperatures 10° C., 25° C., 45° C. and a fixed charging current of 2500 mA.

FIG. 1 illustrates a property curve diagram of the temperature variation and the charging battery voltage variation with charging time variation. The figure focuses on a fixed amount of charging current (2500 mA) and ambient temperature of 10° C., 25° C., and 45° C.

Referring to FIG. 1, the solid line A represents the charging battery voltage variation with the charging time for the ambient temperature 10° C. and a fixed charging current of 2500 mA. The solid line A rises smoothly from the initial voltage 10.5 V to the saturated voltage 12.8 V, and the corresponding time is between 80 and 90 minutes known as saturated time. The solid line B represents the battery temperature variation with the charging time for the ambient temperature of 10° C. and the fixed charging current of 2500 mA; initially, the charging battery temperature curve, solid line B, rises smoothly, and then tends to be even between 30 and 80 minutes of the charging time but when it arrives at the saturated time, the charging battery temperature rises suddenly. The dotted line C represents the charging battery voltage variation with the charging time for the ambient temperature 25° C. and the fixed charging current of 2500 mA. The dotted line C rises smoothly from initial voltage 10.5 V to the saturated voltage 12.5 V. The dotted line D represents the battery temperature variation with the charging time for the ambient temperature of 25° C. and the fixed charging current of 2500 mA. Initially, the dotted line D rises smoothly and then tends to be even between 30 and 80 minutes of the charging time; when it arrives at the saturated time, the charging battery temperature rises rapidly. Other dotted lines E and F, respectively, represent battery charging voltage and temperature variation with charging time for the ambient temperature of 45° C. and the fixed charging current of 2500 mA as described above.

In view of the above, when charging up a battery, the battery temperature increases as the ambient temperature increases. The battery charging voltage decreases as the ambient temperature increases. When a charging voltage curve line arrives at saturation, the battery temperature rises rapidly. Because the charging battery's saturating voltage will be changed by ambient temperature variation, it cannot be a dependable factor for judging battery saturation.

According to the properties of a charging battery, present apparatuses for detecting charging status usually only check the charging battery temperature with respect to whether it has risen rapidly. In other words, conventional devices check the saturated status by means of the slope of charging battery's temperature.

Figure 2:
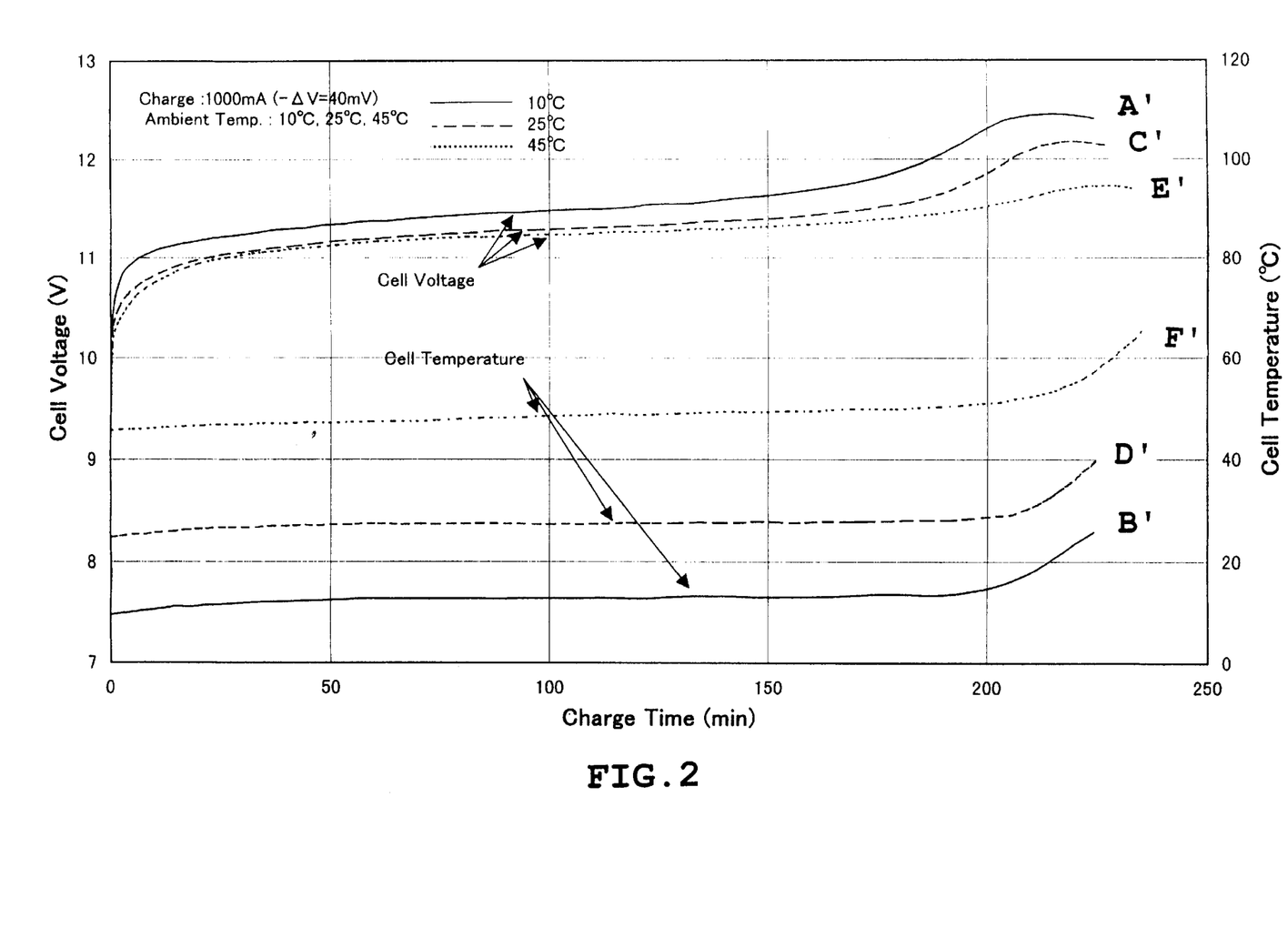
FIG. 2 illustrates a curve line diagram of charging battery voltage variation with the charging time for ambient temperatures 10° C., 25° C., 45° C. and a fixed charging current of 1000 mA.

FIG. 2 only changes the charging current of FIG. 1 from 2500 mA to 1000 mA. The solid line A' represents charging battery voltage variation with the charging time for ambient temperature of 10° C. and a fixed charging current 1000 mA. By changing the charging current to 1000 mA, the saturating time is extended from 80 to 200 minutes, and the saturating voltage decreases from 12.8 V to 12.3 V. The solid line B' corresponds to A' of FIG. 2. As shown, when the charging time arrives at 200 minutes, the slope of the battery temperature increases suddenly. The dotted lines C', D', E', and F' respectively correspond to the dotted lines C, D, E and F of FIG. 1, except that the charging current is changed from 2500 mA to 1000 mA.

As shown in FIG. 1 and FIG. 2, both the ambient temperature variation and charging current variation have an impact on the saturated voltage and the charging time. Specifically, when the charging current increases more, the charging time decreases more. But when the charging current is lower, the charging time is more extended, and the battery temperature curve line is more flat. In other words, if charging current is much lower, the battery temperature curve line is too flat to judge saturated status by the slope of the battery temperature curve line. In contrast to relatively lower charging current, if the charging current is relatively high, then the battery will be overloaded and burned.

Figure 3:
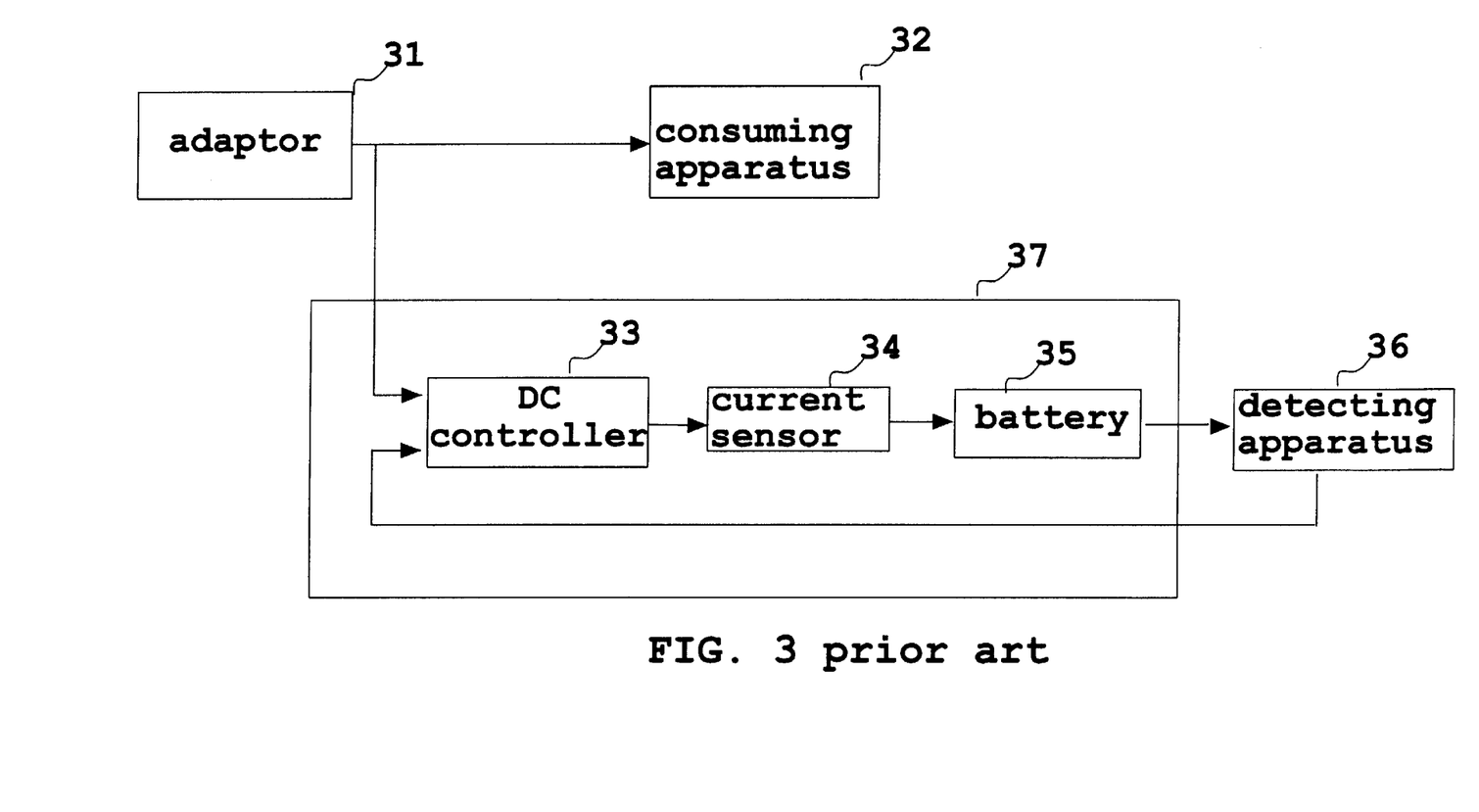
FIG. 3 illustrates a block diagram of a prior art fixed current charging system.

FIG. 3 shows a prior art block diagram of a nickel-hydrogen or a nickel-cadmium battery. An adapter 31 transforms the power from an alternating current (AC) voltage to a direct current (DC) voltage, and supplies both a consuming apparatus 32 and a charging apparatus 37 herein comprising a DC controller 33 to transform the DC voltage of the adapter 31 into the DC current herein and charging up the battery by passing to a current sensor 34. At the same time, a detecting apparatus 36 monitors the temperature variance of charging battery 35 at particular time to control the DC controller 33 to continue the charging operation.

Figure 4:
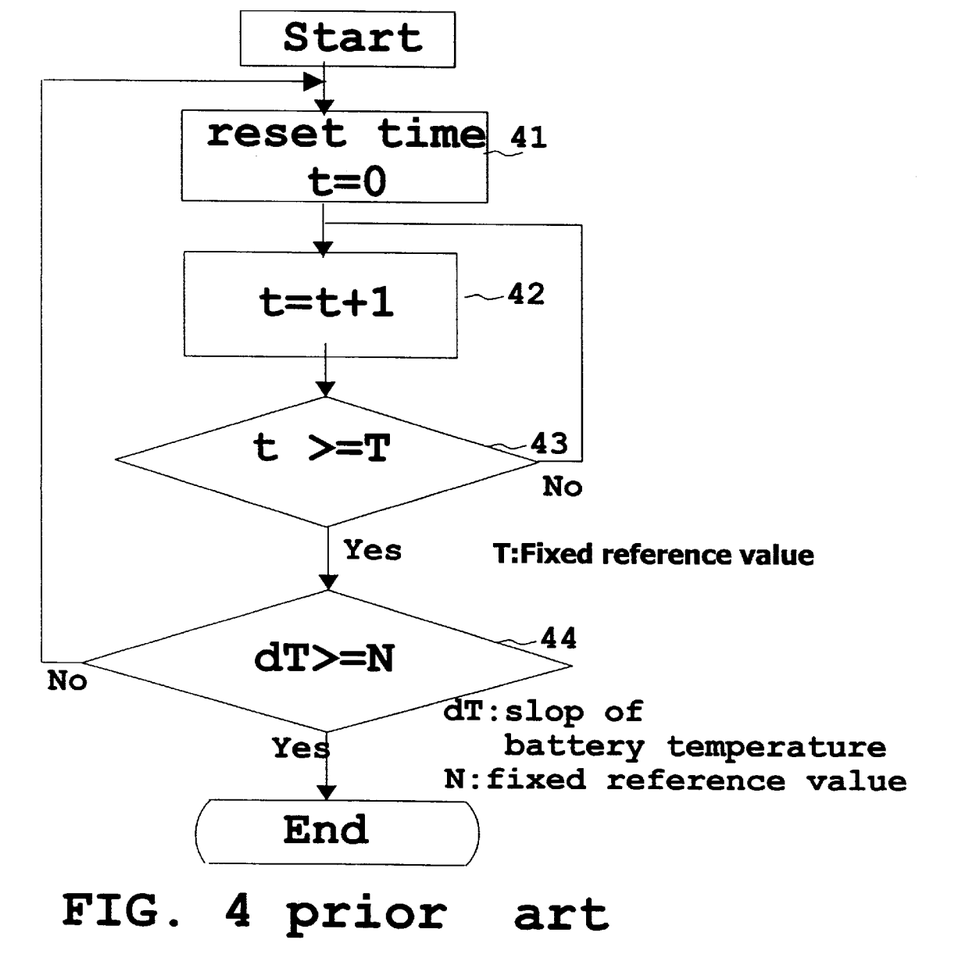
FIG. 4 illustrates a flow chart of the fixed current charging detecting method in accordance with the prior art.

FIG. 4, which is related to FIG. 3, shows a flow chart diagram illustrating a charging method in which step 41 resets time t, step 42 accumulates time t until step 43 at which t equals a fixed reference time T, and then step 44 judges the rising slope of battery temperature (dT), namely, whether it is greater than a fixed reference value N and, if so, thereby ending the charging operation or whether the process should return to step 41.

Thus, in the prior art, the charging battery is deemed saturated by focusing on battery temperature variance in a fixed time for a fixed current charging operation.

Referring to FIG. 1 and FIG. 2, when a charging current increases, charging time decreases. However, the amount of charging current is still restricted within a maximum charging. Even though many portable products such as notebook computers need to hold enough power to operate all functions including CPU (central process unit) requests, the charging apparatus typically adopts a minimum charging current to process charging up the battery. For example, a maximum charging current is usually 2500 mA for a nickel-hydrogen or nickel-cadmium battery for a notebook computer, but its charging current is often kept at 1000 mA. Therefore, even if several components of the consuming apparatus 32 are idle, the current not in use cannot be offered to the charging apparatus to accelerate charging time. If more current is offered to the present fixed current charging apparatus, then it is easy to misjudge the battery saturated status due to the sudden change of the amount of charging current which induces a sharp variable slope of the battery temperature.

SUMMARY OF THE INVENTION

Present detecting methods do not suit variable current charging. According to fixed current charging, conventional detecting methods adopt a period of fixed time to judge the rising slope of the battery temperature to determine whether it is saturated or not.

For variable current charging, the present invention takes the properties of the equivalent resistance of a battery regardless of charging current. The charging current flows through the equivalent resistance of a battery, and induces the corresponding heat energy herein corresponding to a reference value of the energy herein corresponds to an amount of the flowing charging currents through the equivalent resistance of a battery. Referring to FIG. 1 and FIG. 2, when the battery is saturated, the temperature of a charging battery rises suddenly; that is, the corresponding heat energy rises suddenly. A fixed heat energy corresponds to a fixed reference value of the energy. Therefore, during the charging up of the battery for a fixed energy, the rising slope of the battery temperature is measured to correctly judge the saturated status of a charging battery. The invention can avoid misjudgment during battery temperature moves up and down by current alteration.

For variable current, the consumption energy of the equivalent resistance of the charging battery is in direct proportion to the amount of the charging current. When charging current increases, then the corresponding amount of consumption energy increases. In other words, in a period of fixed time the present invention accumulates variable charging currents to know the consumption energy of the equivalent resistance of the charging battery and, more specifically, if it is greater than the fixed energy reference value.

Accordingly, the invention provides an apparatus for a variable currents charging operation. The apparatus comprises a first current sensor which transforms a current to a first signal, a controller which depends on the first signal to transform the power to a current in order to change the amount of charging currents, a second current sensor which transforms the charging currents to a second signal and passes the charging currents to charge up the battery and a detector which depends on the second signal and a third signal that, in response to the battery, triggers the controller regarding whether to terminate transforming or not.

In order to satisfy the above-mentioned detector, the invention provides a detecting apparatus comprising a sensor to measure the charging currents as a signal. A first detector accumulates the signal until an accumulating value is greater than a first reference value, the accumulating value is then reset to zero. At the same time, the accumulating process continues and a second detector judges whether the battery has arrived at a saturated status or not according to the temperature variance of the battery and, specifically, whether it is greater than a second reference value during a period equivalent to two reset events. The detector, which can be replaced by firmware, also provides a detecting method comprising measuring charging currents, and accumulating the amount of charging currents until a cumulative value is greater than a first reference value of energy, and then resetting the accumulating value to zero. At the same time, it continues to accumulate the amount of charging currents; judges the battery with respect to whether it reaches saturated status or not according to the temperature variance of the battery and whether it is greater than a second reference value during a period equivalent to two resetting events of the accumulating value.

BRIEF DESCRIPTION OF DRAWINGS

The present invention will now be described in detail in accompaniment with the following and drawings.

DETAILED DESCRIPTION OF THE INVENTION

Figure 5:
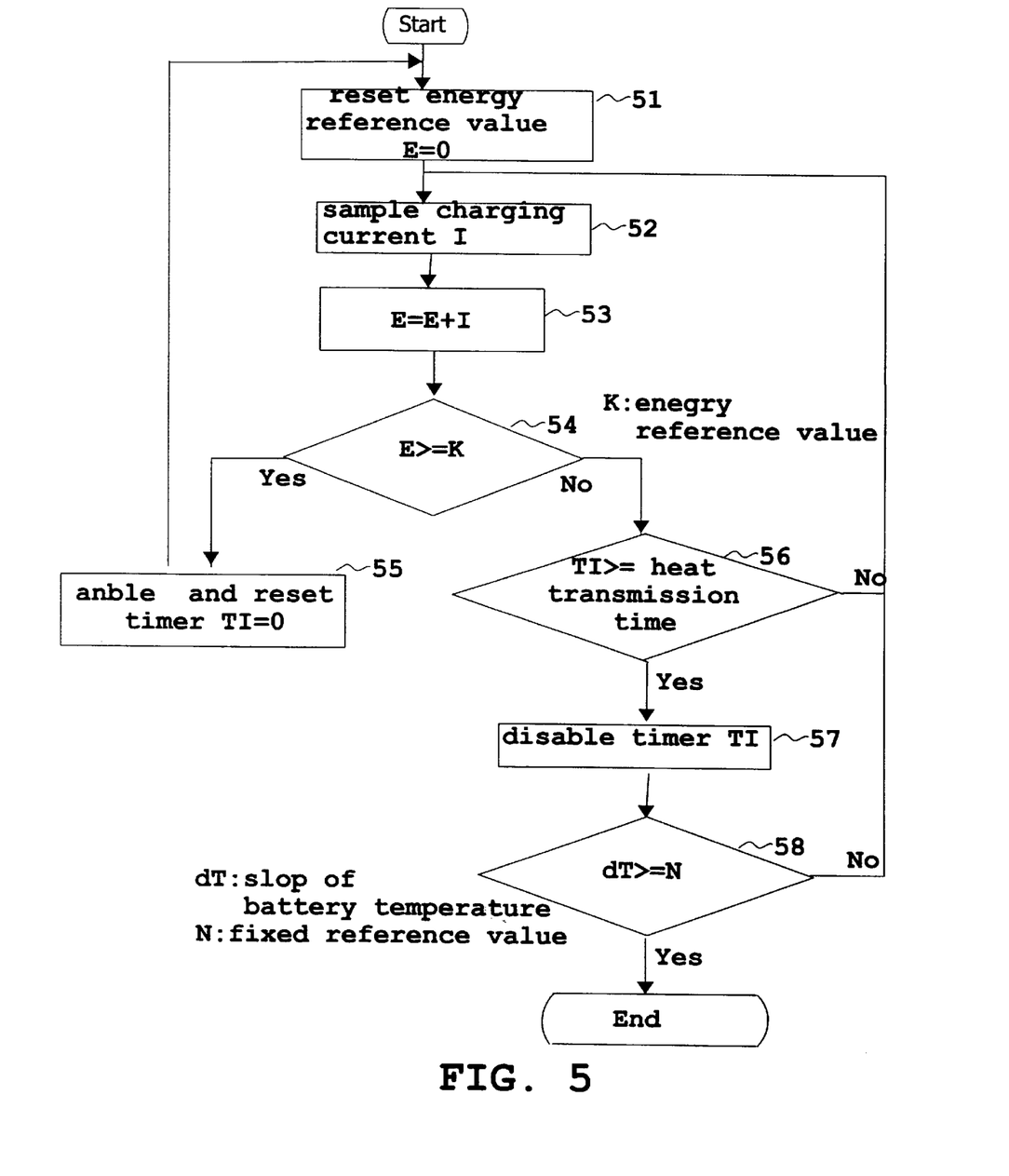
FIG. 5 illustrates a flow chart of charging detection employing variable currents in accordance with the present invention.

FIG. 5 illustrates a flow chart for detecting charging. At step 51 an energy reference value E is reset. Step 52 samples charging current. Step 53 accumulates a charging current value, as an energy reference value E; until, at step 54, the energy reference value E equals a fixed reference value. After step 54, a timer, T1, is triggered and timer T1 is reset to zero. At the same time, step 52 and step 53 continue. Step 56 judges timer T1 with respect to whether it was started and accumulated time has reached the heat transmission time. If the result of step 56 is "yes", the timer is disabled, step 57, and then step 58 is executed to judge the rising temperature slope, dT, of the battery to determine if it is greater than a fixed reference value N for stopping the charging operation. If the condition is not satisfied at step 56, the process continues to step 52 and step 53. The purpose of using the timer is to model the equivalent resistor of the battery as it accumulates a fixed energy, and it is desirable to wait for a substantial time to ensure that the battery temperature of the accumulated fixed energy value is measured correctly.

As mentioned above, the invention suits variable current charging for detecting the saturated status and accumulates the fixed energy, then the process of the invention judges the rising temperature of battery as to whether it reaches saturated status in order to determine whether to end the charging operation or continue to reset the energy reference value.

Figure 6:
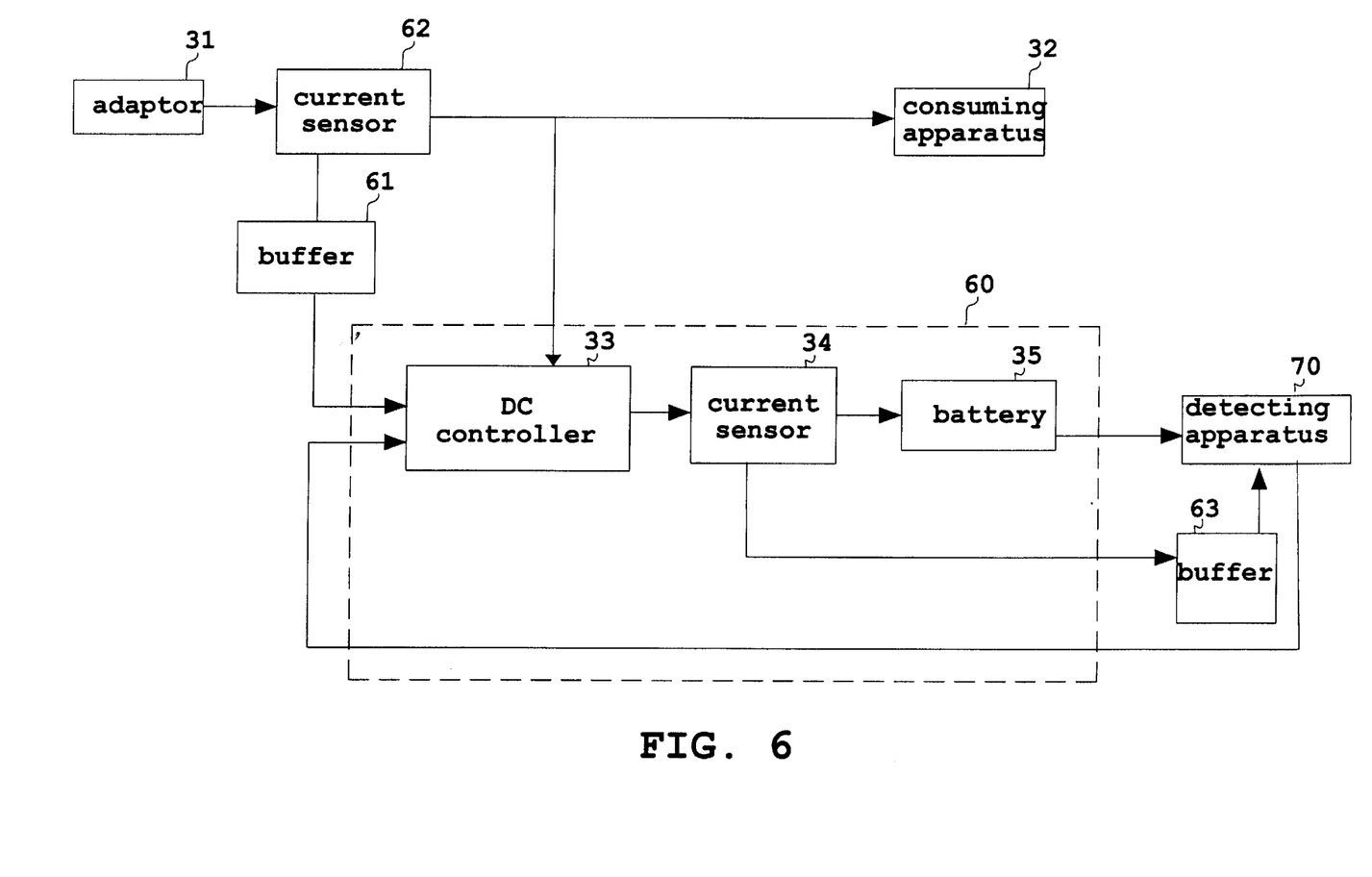
FIG. 6 illustrates a block diagram of variable currents charging in accordance with the present invention.

FIG. 6 shows a block diagram charging apparatus in accordance with the present invention. An adapter 31 provides currents to a consumption apparatus 32 and charging apparatus 60 including current sensor 62 which responds to buffer 61 with a measuring charging current. A charging apparatus 60 comprises a direct voltage/direct currents transformer 33 which transforms the direct voltage into a direct current. Through a current sensor 34, it proceeds the charging operation for a charging battery 35, and then the direct voltage/direct current transformer 33 receives the measuring charging current of the buffer 61 in order to charge with variable currents. At the same time, a detecting apparatus 70 measures the amount of the accumulated energy reference value until a fixed reference value takes data from a buffer 63 coupled to the sensor 34, and then the detector 70 judges the temperature variance, via a thermometer (not shown), of the charging battery 35 during the accumulated fixed energy in order to trigger the direct voltage/direct current transformer 33 to the charging operation.

Figure 7:
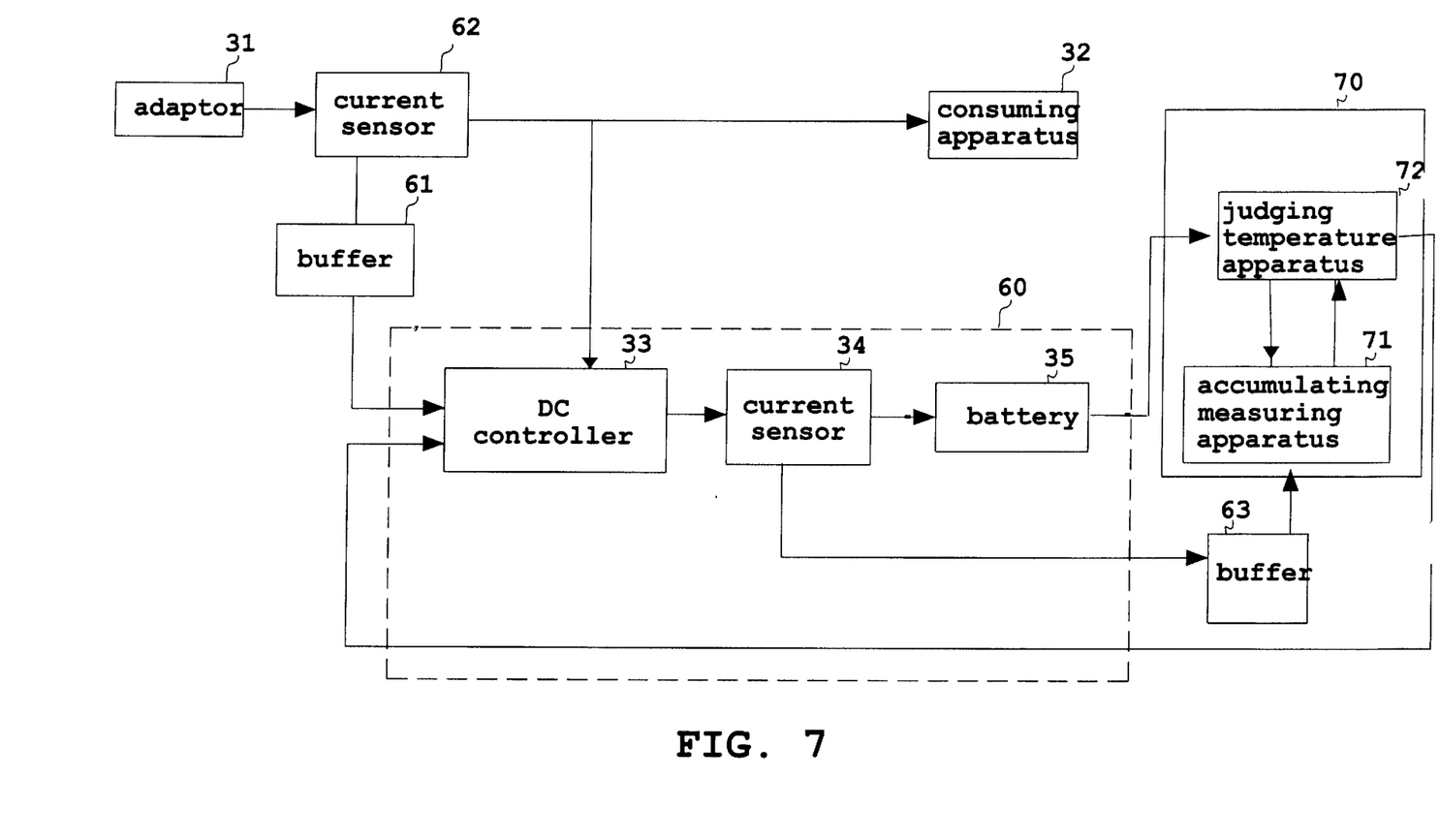
FIG. 7 illustrates an apparatus block diagram of the charging detection of variable currents in accordance with the present invention.

FIG. 7 follows FIG. 6 and illustrates a detail of charging detecting apparatus 70 of the block diagram. The charging detecting apparatus 70 comprises an accumulating measuring apparatus 71 and a judging temperature apparatus 72. The accumulating measuring apparatus 71 measures the amount of the accumulated energy reference value until a fixed reference value takes data from buffer 63 coupled to sensor 34, and then resets the accumulating reference value of the accumulating measuring apparatus 71 to zero. At the same time, it enables judging temperature apparatus 72 and decides to inform the direct voltage/direct current transformer 33 to stop the charging operation by the thermometer (not shown) of the charging battery 35 while still accumulating the fixed energy.

What is claimed is:

1. A charging apparatus for charging a battery using variable currents, said charging apparatus comprising:

a first current sensor that transforms a current into a first signal;

a controller which depends on said first signal to transform power into a current in order to supply said variable currents;

a second current sensor which transforms said variable currents into a second signal and passes said variable currents to charge said battery; and a detector which relies on said second signal and a third signal in response to said battery to trigger said controller and to determine whether to terminate transforming operations.

2. The charging apparatus of claim 1, wherein said detector comprises:

a sensor which measures charging currents as said second signal;

a first detector which accumulates said second signal as an accumulating value until said accumulating value is greater than a first reference value and then resets said accumulating value to zero, and which thereafter continues to accumulate said second signal; and a second detector for determining whether said battery has reached a saturated status in view of temperature variance of the battery determined by whether a third reference value is greater than the second reference value during any two consecutive resets of said accumulating value.

3. The charging apparatus of claim 1, wherein said charging currents are limited to a maximum safety current.

4. The charging apparatus of claim 1, wherein said charging currents are kept above a minimum current which is capable of causing a sudden temperature rise in said battery.

5. The charging apparatus of claim 1, wherein said detector is comprised of firmware.

6. The charging apparatus of claim 1, wherein said detector is operable with nickel-hydrogen or nickel-cadmium batteries.

7. The charging apparatus of claim 2, wherein said accumulating value is represented by accumulated electric charges.

8. The charging apparatus of claim 7, wherein sad electric charges are accumulated in an integrator.

9. A method of detecting charging of a battery, comprising the steps of:

measuring an amount of charging currents;

accumulating said amount of charging currents as an accumulating value until the accumulating value is greater than a first reference energy value;

resetting said accumulating value to zero;

further accumulating said accumulating value; and judging whether said battery has reached saturated status by determining whether a temperature variance of said battery is greater than a second reference value during any two consecutive steps of resetting said accumulating value.

10. The method of claim 9, wherein said accumulating value is generated by accumulating electric charges.

11. A detector for measuring the saturation status of a battery, the detector comprising:

a sensor for measuring charging currents as a second signal;

a first detector for accumulating said second signal as an accumulating value until said accumulating value is greater than a first reference value, for resetting said accumulating value to zero and for further accumulating said second signal; and a second detector for judging said battery as to whether said battery has reached saturation by monitoring a temperature variance of the battery as a third reference value and determining whether said third reference value is greater than the second reference value during any two consecutive resets of said accumulating value.

12. The detector of claim 11, wherein said second detector is operable to send a signal indicative of whether said battery has reached saturation.

* * * * *